No. 733,849. PATENTED JULY 14, 1903.
T. A. KILLMAN.
BALING PRESS.
APPLICATION FILED JULY 30, 1902.
NO MODEL. 10 SHEETS—SHEET 1.

No. 733,849. PATENTED JULY 14, 1903.
T. A. KILLMAN.
BALING PRESS.
APPLICATION FILED JULY 30, 1902.
NO MODEL. 10 SHEETS—SHEET 2.

No. 733,849. PATENTED JULY 14, 1903.
T. A. KILLMAN.
BALING PRESS.
APPLICATION FILED JULY 30, 1902.
NO MODEL. 10 SHEETS—SHEET 5.

Fig. 3.

Witnesses
Chas H. Ourand
Jno E. Parker

Thomas A. Killman
Inventor
by C. A. Snow & Co
Attorneys

No. 733,849. PATENTED JULY 14, 1903.
T. A. KILLMAN.
BALING PRESS.
APPLICATION FILED JULY 30, 1902.
NO MODEL. 10 SHEETS—SHEET 6.

No. 733,849. PATENTED JULY 14, 1903.
T. A. KILLMAN.
BALING PRESS.
APPLICATION FILED JULY 30, 1902.
NO MODEL. 10 SHEETS—SHEET 9.

No. 733,849.                                                                                   Patented July 14, 1903.

UNITED STATES PATENT OFFICE.

THOMAS A. KILLMAN, OF LIBERTY, TENNESSEE.

BALING-PRESS.

SPECIFICATION forming part of Letters Patent No. 733,849, dated July 14, 1903.

Application filed July 30, 1902. Serial No. 117,691. (No model.)

*To all whom it may concern:*

Be it known that I, THOMAS A. KILLMAN, a citizen of the United States, residing at Liberty, in the county of Dekalb and State of Tennessee, have invented a new and useful Baling-Press, of which the following is a specification.

This invention relates to certain improvements in baling-presses for the formation of hay, straw, fodder, and other material into bales.

One of the principal objects of the invention is to provide a baling-press that may be used in connection with threshers, shredders, and machinery of like character to receive the straw, shredded fodder, or other material directly from such machines and to automatically form the same into bales as it is delivered.

A further object of the invention is to provide an improved form of mechanism for automatically forming any material into continuous bales and to separate and tie the same into single bales of uniform size.

A still further object of the invention is to provide mechanism for automatically regulating the thickness of the web or bat from which the bale is formed and to prevent choking the machine from excessive and irregular feeding.

A still further object of the invention is to insure the regular and even feed and compression of the web or bat in the compression or baling chamber.

A still further object is to provide automatic mechanism for setting the bale tying and knotting mechanism into operation for the formation of bales of uniform size.

A still further object of the invention is to provide an improved wire knotting and twisting mechanism for tying the ends of the wire around a finished bale.

A still further object of the invention is to provide an improved mechanism for severing the wire from the reel or needle wire after the twisting operation has been accomplished.

With these and other objects in view the invention consists in the novel construction and arrangement of parts hereinafter described, illustrated in the accompanying drawings, and particularly pointed out in the appended claims.

In the drawings, Figures 1 and $1^a$ represent a side elevation of a baling-press constructed in accordance with my invention, illustrating the same provided with running-gear in order that it may be traveled in connection with a threshing, shredding, or similar machine. Figs. 8, 9, 10, and 11 are detail views, partly in the nature of diagrams, illustrating the knotting mechanism in different positions during the process of tying a bale. Fig. 15 is a sectional view of one of the wire-twisters, illustrating the supporting means.

Similar numerals of reference are employed to indicate corresponding parts throughout the several figures of the drawings.

In the machine shown in the accompanying drawings the supporting-frame 10 is mounted on wheeled axles in order that the machine may be readily moved from place to place in connection with a threshing or shredding machine and used in the field to automatically bale the straw, shredded fodder, or other material as the same is delivered from said machines; but it will be understood that the frame 10 may be mounted on a suitable stationary base and supplied with the material to be baled in the usual manner without departing from the invention.

The frame 10 is formed of strongly-braced timbers or structural-iron beams and at the rear or discharge end of the baling-chamber is provided with inwardly-extending pivot-pins 11 11', on which is pivotally mounted an elongated frame forming the baling-chamber and a supporting device, in which the web or bat is compressed into a bale and then bound by the bale-wire. The baling-chamber comprises, essentially, a plurality of longitudinally-disposed beams 12, to which are connected upper and lower cross-bars 13, arranged in pairs and united by tension-bolts 14 for resisting the expansive tendency of the baled material. At the discharge end of the baling-chamber the tension-bolts 14' are provided on their threaded upper ends with hand-wheels 15, having centrally-disposed threaded hubs forming nuts which may be turned to compress the bales at this point and prevent too-free discharge of the bales, the latter being held and resisting the compressive action of the baling-rollers as the web is gradually fed into the baling-chamber and pressed in place. The baling-chamber receives a vertical oscillating movement on its pivot-pins, and at the feed end it is curved on a line concentric with a fulcrum-point formed by the pivot-pins 11. On each side of the baling-chamber are cheek-plates 16, to which are secured curved racks 17, adapted to engage with the teeth of pinions 18, mounted on the opposite ends of transversely-disposed compression-roll shafts 20. Each shaft 20 carries a compression-roller 21, which serves to gradually compress the web or bat into the compression-chamber, and rotative movement thereof is assured by reason of the contact of the racks and pinions, the entire series of rollers being constantly kept in position during the oscillatory movement of the baling-press by intervening idler-gears 22, between the pinions of the adjacent rollers and serving to keep all of the pinions in constant motion, even if the rack be disengaged therefrom. By this means the pinions are kept in proper position to intermesh with the racks as the latter are oscillated, and breakage of teeth and jamming of the gears are prevented.

Figure 4:
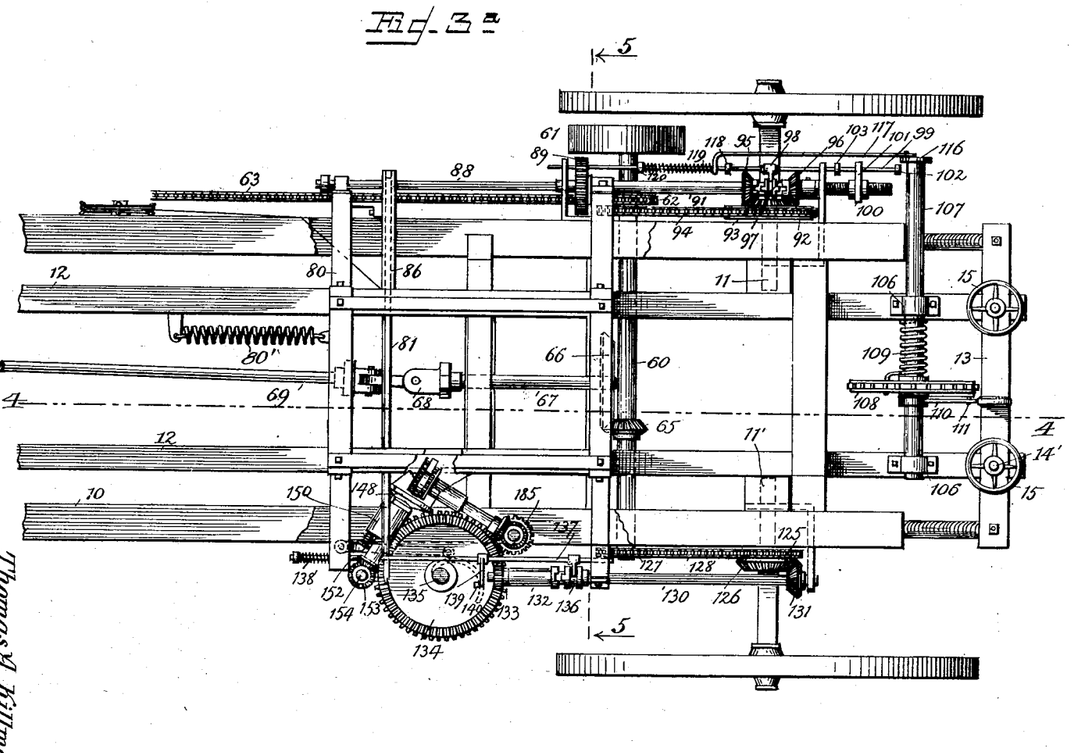
Figs. 4 and $4^a$ represent a longitudinal sectional elevation of the machine on the line 4 4 of Figs. 4 and $4^a$.
Figures 4A, 15:
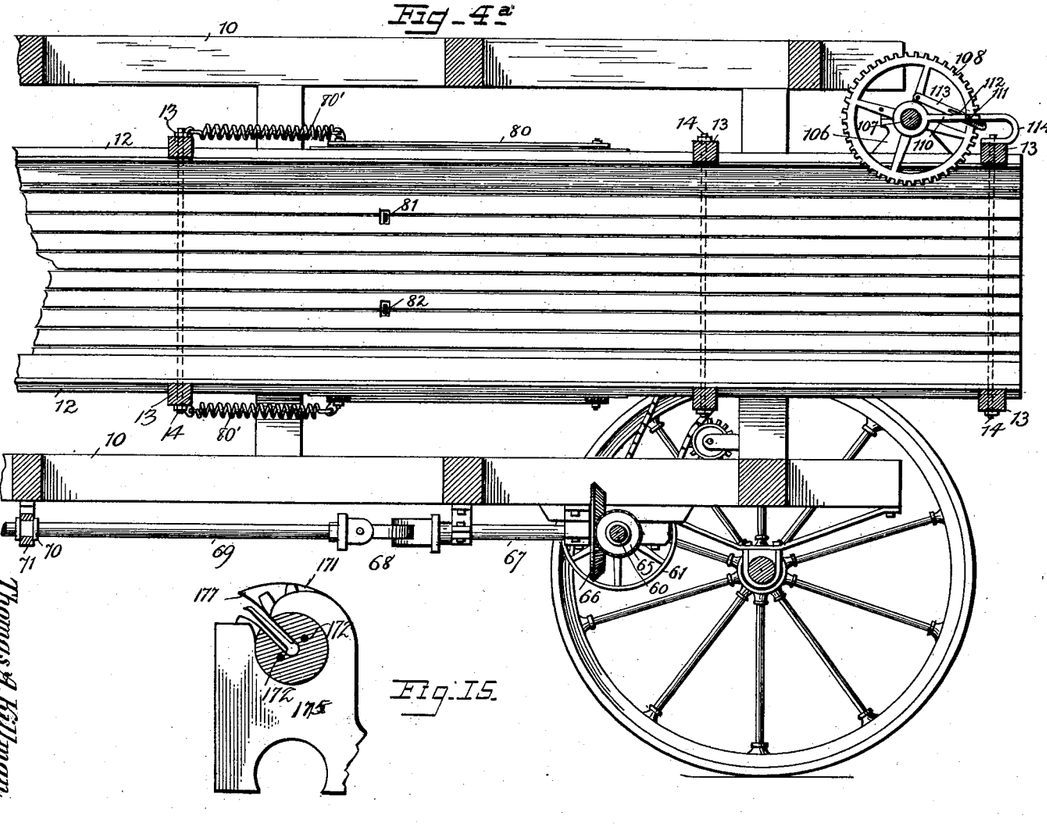

The oscillatory baling-chamber and rollers act in the well-known manner on a continuous web or bat of material fed to the chamber, and for the purpose of insuring a perfectly uniform feed I employ the mechanism best shown in Fig. 4.

At the feed end of the machine are rearwardly-extending supporting-bars 25, partly supported by tie-bars 26 and provided with removable side plates 27, forming a receptacle into which the material to be baled is delivered. To each of the side supporting-bars is secured a guide for the reception of a movable journal-box 28, carrying a shaft 29, on which are arranged a number of sprocket-wheels 30, and at the rear end of the main frame are suitable journals for the support of a shaft 31, carrying a series of similarly-arranged sprocket-wheels 32. The sets of sprocket-wheels serve as supports for a plurality of link belts 33, the links of which carry spaced teeth 34, each tooth being bifurcated or having two wings for the reception of a clearance-rod 36, extending from end to end of the belts and having their inner ends arranged on a curved line of greater radius than that of the belts. The several chains are connected at frequent intervals by transversely-disposed slats 37 for the support of the material to be baled, and as such material is received on the slats it is traveled into the machine in the direction of web-forming rollers 39 and 40. The lower roller 39 is arranged at a point slightly to the rear of the inner end of the feed-belt, and the clearance-bars are turned downwardly and inwardly under said roller. Owing to the position and relative curvature of the clearance-bars and the line of movement of the teeth 34, the material feed by the teeth is gradually raised from contact therewith and forced in the direction of the baling-chamber. As the clearance-bars extend the full length of the feed-belt, there is no danger of any of the material accumulating between the points of the teeth and choking the machine or being carried back in the reverse direction by said teeth.

In order to prevent the passage of an excessive quantity of material and to regulate the thickness of the web supplied to the baling-chamber, I employ a plurality of leveling fingers or teeth 41, extending through diametral openings in the rock-shaft 42, mounted in suitable bearings in the frame. The teeth are adjustable toward and from the feed-belt in order to permit the passage of any desired quantity of material and in operation serve to engage and throw to the rear any excess of material and distribute such material more evenly over the belt, with the result that a web or bat of substantially uniform thickness will be fed to the web-forming roller 5.

Of the web-forming rollers the roller 39 is mounted on a shaft 43, having stationary bearings, and at a point outside the frame is provided with a gear-wheel 44, having elongated teeth adapted to engage the similar teeth of a gear-wheel 45, mounted on the shaft 40' of the upper web-forming roller. The upper roller 40 is mounted in bearings supported by opposite side springs 46, which yield to permit the passage of successive quantities of material and in all cases exercise compressive force on a thin web of material passing between the rollers. The shaft 40' is provided at a point outside the framework with a sprocket-wheel 47, over which passes a link belt 48, receiving motion from a sprocket-wheel 49, mounted on a shaft 50, having bearings in the frame. The link belt 48 also passes over a sprocket-wheel 51, mounted on the shaft 31 at the inner portion of the feed-belt in order to drive said belt, and is guided to permit vertical movement of the spring-roller by means of an idler 52, mounted on a stud 53, projecting on the side of the frame.

Whenever necessary, the distance between the belt-carrying shafts 29 and 31 is adjusted by means of screws 54, passing through threaded openings in the journal-carrying slides 28 and bearing against stationary studs 55, projecting from the sides of the extensions 25 of the frame.

After passing between the web-forming rollers 39 and 40 the web passes between guards 56 and 57 on its way to the baling-chamber and is guided into said chamber by the centrally-disposed spaced rollers 21', forming part of the series of compression-rollers 21.

In order to transmit the necessary oscillatory or rocking movement to the spreading and distributing teeth 41, the shaft 42 of the latter is provided with a crank 57', connected by a pitman 58 to a revolving crank 59, carried at one end of the shaft 43, the crank 59 receiving a complete rotative movement, while the crank 57' is merely oscillated to impart a rocking movement to the shaft 42.

All of the movable elements of the machine are driven from the shaft 60, having at one end a belt-wheel 61, connected to a traction-engine or other suitable source of power. This shaft is provided with a plurality of sprocket-wheels, one of which, 62, is connected by a link belt 63 to a sprocket-wheel 64, mounted on the shaft 50, from which motion is transmitted to the various feeding and web-forming devices.

On the shaft 60 is secured a bevel-pinion 65, intermeshing with a bevel-wheel 66, mounted on a shaft 67, journaled under the main frame and connected by a flexible coupling 68 to a rearwardly-extending shaft 69, supported at its outer end in a bearing-block 70. The bearing-block 70 is grooved on its upper and lower faces and is guided in a slot formed in a transversely-extending bar 71, carried by the frame 10 of the machine, and is free to move laterally within said slot, excessive movement in either direction being prevented by an elongated vertically-disposed guiding-frame 72, movable with the baling-chamber, the inner surface of said guiding-frame being at all times in contact with an antifriction-collar 73, arranged on said shaft 69.

To the lower portion of the feed end of the baling-chamber are secured brackets 74 for the reception of the opposite ends of a pivot-pin 75, on which is hung a rack-bar 76, secured to or forming a part of the frame 72 and provided with a plurality of inwardly-projecting teeth in the form of pins 77, with which engage the teeth of a pinion 78, mounted on the extreme end of the shaft 69. In the operation of this portion of the mechanism the web is fed to the baling-chamber in the manner well known in this class of presses, and the baling-chamber is oscillated by means of the pinion 78, which is rotated constantly in one direction and travels first on one side of the teeth 77 and then on the opposite side thereof, being always held in intimate contact with said teeth by the frame 72. The operation results in an oscillating movement of the baling-chamber, there being a slight dwell as the pinion is passing the end teeth or pins and permitting the slow stopping of the movement of the baling-chamber and affording ample time for the turning of the web for the formation of the next layer of the bale. The successive layers added to the bale gradually force the completed bale out through the discharge end of the baling and knotting chamber, fresh portions of the bale being continuously moved to proper position to be acted upon by the needles and twisting devices and tied into bales of uniform size. This portion of the mechanism is operated intermittently and is set into operation automatically as soon as sufficient material has passed a given point to make a bale of the required size, this being accomplished without regard to the speed at which the compression and feeding mechanism is operated.

Near the rear end of the baling-chamber is mounted a suitable metallic frame extended laterally on each side of the baling-chamber and serving as a support for the several members of the knotting and wire-cutting mechanism.

In the present machine it is designed to employ two wires for binding each bale and to introduce the wires across the baling-chamber and divide a bale from the compressed hay or other material within the baling-chamber, I employ two needles 81 and 82, each having a pointed end provided with a suitable eye 83 for the passage of the wire and each having a recess 84 near the pointed end to permit the introduction of the looper, which takes the wire from the needle and forms a loop which is subsequently acted upon by a twisting device. The under sides of the needles are provided with racks and are mounted in suitable guideways 86, carried by the supporting-frame 80 at one side of the machine. The needle-racks are engaged by small pinions 87, mounted on shafts 88, having suitable bearings in the frame 80 and provided at their opposite ends with gear-wheels 89, intermeshing with a pinion 90, mounted on a shaft 91, having suitable bearings in the framework.

The pivot-pin 11 of the baling-chamber is extended to a point outside the chamber and there provided with a sprocket-wheel 92 and a bevel-gear 93, the sprocket-wheel being continuously revolved through a link belt 94 and a sprocket-wheel on the main driving-shaft 60. The bevel-gear 93 intermeshes with said bevel-pinions 95 and 96, mounted loosely on the shaft 91, said pinions being revolved continuously in opposite directions and so arranged that either may be clutched to the shaft to drive the same. The adjacent faces of the gear-wheel hubs are provided with clutch-faces for engagement with a longitudinally-movable clutch 97, feathered on the shaft 91 and movable by a yoke 98, secured to a slidable rod 99, which is supported by brackets extending from the frame. One end of the shaft 91 is threaded for the reception of a nut 100, having an extending arm 101, perforated or slotted for the passage of the rod 99, and on said rod are two fixed collars 102 and 103, which may be engaged by the arm 101 to effect a shifting movement of the rod and a corresponding movement of the clutch.

106 represents suitable bearing-blocks mounted above the baling-chamber and supporting a shaft 107, on which is mounted a toothed wheel 108, the circumference of which is equal to the length of bale which it is desired to manufacture, the toothed wheel being engaged by the compressed material in the baling-chamber and being revoluble to determine the length of bale. This wheel is loosely mounted on the shaft and is connected thereto by a torsion-spring 109, secured at one end to the shaft and at the opposite end to the wheel. To the shaft is rigidly secured a radial arm 110, from which projects a pin 111, fitted in a slot 112 in an arm 113, pivoted at one end to one of the spokes of the wheel 108. The arm 113 in rotating will engage a fixed stop 114, carried by the baling-chamber, and being engaged with the pin of the radial arm 110 will naturally stop the rotative movement of the shaft. The wheel continues rotating while in contact with the bale, and the spring is gradually wound to increase its torsional strain until the end of the arm 113 is carried beyond the end of the stop 114 and being released permits the rotative movement of the arm 110, carried by the shaft, the shaft and arm receiving a very rapid rotative movement under the influence of the spring. This movement is transmitted through a crank-arm 116 at the end of the shaft to a rod 117, the latter being bent at a right angle at its opposite end and perforated for the passage of the rod 99. When the shaft and crank 116 are moved, the rod 117 engages a fixed collar 118 on the rod 99 and moves the rod 99 and the clutch 97 into engagement with the hub of the bevel-gear 96, the latter being thus clutched to the shaft 91 and operating the same. The shaft 107 continues to rotate for a short distance, and the perforated end of the rod 117 is pushed back from contact with the collar 118 and into contact with a spring 119, which is partly compressed by this movement. The spring encircles the clutch-shifting rod 99, and one end is held against a collar 120, which may be adjusted on the rod to alter the stress of the spring. As soon as the bevel-gear 96 is engaged and the shaft 91 is turned the movement is transmitted through the connecting-gearing to the shafts 88 and the needles 81 and 82, the latter being thrust through the material in the baling-chamber and carrying the wires across to the opposite side, at which point the wires are engaged by the looping and twisting devices. During this movement the nut 100 is being traveled in the direction of the clutch by the threaded end of the shaft 91, and when the arm 101 of the nut comes into contact with the collar 103 the clutch-shifting rod is moved and the clutch is disengaged from the bevel-gear 96 and moved to mid-position. The spring 119 is at this time compressed and serves to impart a further movement to the clutching-rod, the clutch being moved into engagement with the hub of the bevel-gear 95 and the shaft 91 then receiving a rotative movement in the opposite direction, which results in the withdrawal of the needles to initial position.

The operative movement of the needles and the movement of all the bale-tying devices is governed by the wheel 108, the diameter of said wheel governing the length of the bale and the operation being such that the needles and other parts of the knotting mechanism will be actuated only when a predetermined length of baled material has passed under the wheel 108, and this without regard to the quantity of the feed or the speed at which the mechanism is operated.

At the opposite side of the baling-chamber the pivot-pin 11' is extended out beyond the main frame to form a support for a sprocket-wheel 125 and a bevel-gear 126. The sprocket-wheel is continuously revolved from the main shaft 60 by means of a sprocket-wheel 127 and a link belt 128.

At one side of the frame 80 are bearings for the support of a shaft 130, having at one end a bevel-gear 131, intermeshing with the gear-wheel 126 and continuously revolved thereby. At the opposite end of this shaft is a loose sleeve 132, carrying a pinion 133, which intermeshes with a crown-wheel or bevel-gear 134, mounted on a vertically-disposed shaft 135. The sleeve 132 is provided with a clutching-face for engagement with a clutch 136, feathered on the shaft 130 and under the control of a clutch-rod 137, having suitable guides in the framework and provided at one end with a compression-spring 138, normally tending to move the clutch into engagement with the sleeve 132.

The bevel-gear 134 receives one complete revolution at each operation of the knotting mechanism, and to start and stop the mechanism at the proper point the clutch-rod 137 is provided with an arm 139, adapted to be engaged by a cam-block 140 on the upper face of the gear-wheel 134, so that when said gear-wheel completes a revolution the cam will engage the arm 139 and will move the clutching-rod against the stress of the spring 138 to disengage the clutch 136. To release the clutch and again operate the mechanism, a rod or bar 141 is secured to the clutch-rod 137 and arranged in the path of movement of the lower needle 82, so that when said needle nears the limit of its movement across the baling-chamber the end of the needle will engage the bar and effect a rocking movement of the rod 137 to an extent sufficient to raise the arm 139 above the cam 140 and permit the spring 138 to reëngage the clutch and start the wire looping and twisting mechanism into operation. The needles return to the opposite side of the machine before the completion of the revolution of the wheel 134, and the arm 139 is dropped on the face of the wheel in position to be again engaged by the cam 140 at the completion of a revolution of the wheel. By placing the twisting and knotting mechanism under the control of the needle the looper and twister may be timed to act with the utmost accuracy and can only start to operate while the needle is in proper position to deliver the wire.

The gear-wheel on the shaft 135 comprises a bevel-gear 134, a mutilated gear 145, and a continuous spur-gear 146, the wheels 145 and 146 being adapted, respectively, to actuate the looper, which takes the wire from the needle, and a twister, which engages the wire held by the looper and twists the same to securely unite the ends of the bale-wire.

A single looper is employed for each needle, and each looper is in the form of a dished plate or disk 148, having diametrically-opposed hooks 149, adapted to enter the recess 84 of the needle and to engage the wire stretched across the recess between the eye of the needle and the baled material at the opposite side of the baling-chamber. The loopers are mounted on shafts 150, having bearings in brackets or standards 151 and provided at that end opposite the looper with bevel-gears 152, intermeshing with bevel-gears 153 on a vertical shaft 154, which also carries a mutilated gear 155, adapted to engage the mutilated gear 145 on the shaft 135, the arrangement being such that the loopers receive one complete revolution at each operation and are then stopped in initial position until the needles again cross the baling-chamber for the formation of another bale.

Each looper is provided with a segmental slot 157, having sharp cutting edges adapted to coact with a wire-cutter 158, formed at one end of a plunger 159, guided in an opening in the standard 151 and normally held in inoperative position by a compression-spring 160. The plunger is recessed for the reception of a smaller plunger or rod 161, having a corrugated or roughened face 162 and projected slightly beyond the end of the plunger 159 by a compression-spring 163, the plunger or rod being adapted to engage with the wire on the looper in advance of the cutting operation and to hold the same during and after the cutting operation until the severed end of the wire is engaged in a holding-clamp 164, arranged on the rear face of the looper.

The operating mechanism for the plunger comprises a cam 165 on the lower face of the gear-wheel 146, said cam engaging an arm 166, secured to a rock-shaft 167, having suitable bearings in the frame and provided with tappet-arms 168, which engage with the rear ends of the plungers 159 and force both the wire-holder and the wire-cutter to operative positions after the completion of the twisting or knotting operation.

Figures 5, 6, 7:
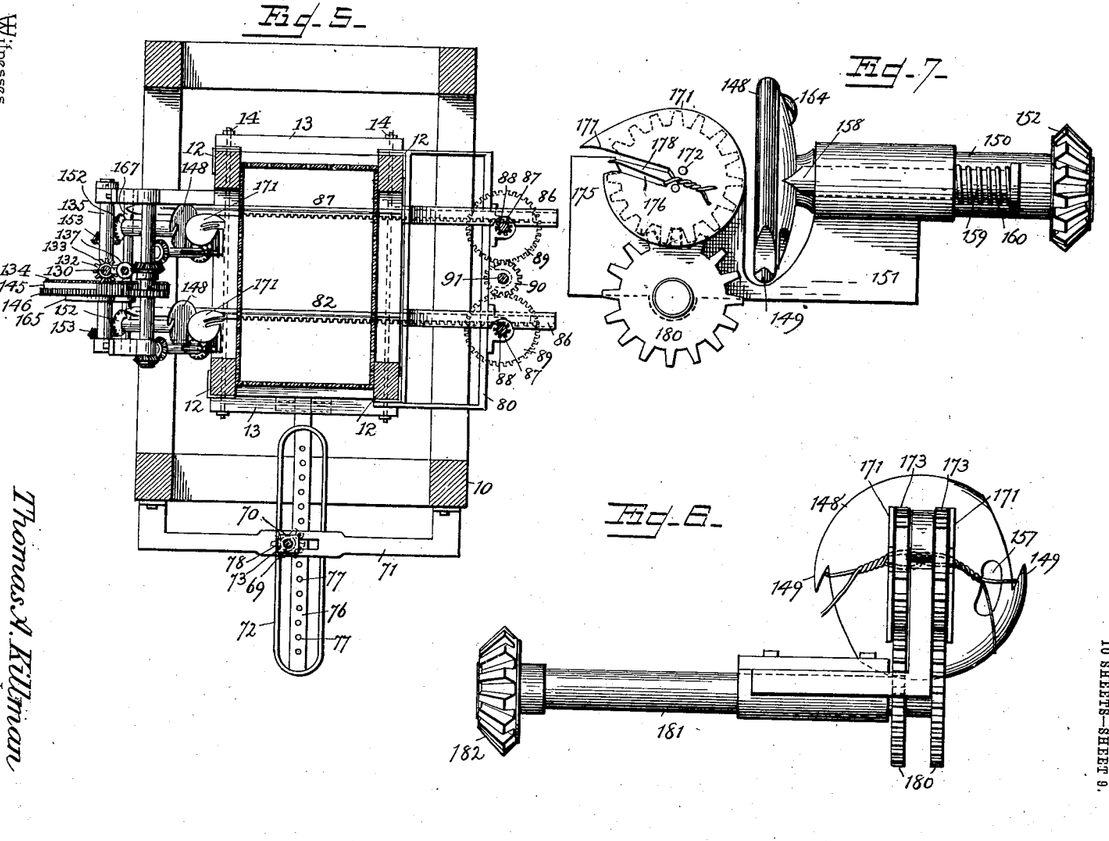
Fig. 5 is a transverse sectional elevation of the machine on the line 5 5 of Fig. $2^a$.
Figs. 6 and 7 are detail views of portions of the knotting mechanism.

The construction of the twister or knotter is best shown in Figs. 6 and 7. Two twisters or knotters are employed, one for each looper, and each comprises a pair of spaced plates 171, secured by pins 172 to spaced gear-wheels 173, which are slightly separated from each other to form a central pocket or chamber for the reception of an intermediate twisted portion of the wire. The pins are eccentric to the center of rotation, and between the gear-wheels is a central hub supported by a curved bar or segment 175, which serves to confine the knotter in position. Each plate 171 is slotted in a radial line from the perimeter to the center, as indicated at 176, and the material at one wall of the slot is extended out beyond the circumferential line of the plates to form a slightly-curved bill or hook 177 for engagement with the looped wire carried by the looper, the adjacent face of the latter being recessed or dished to permit the free movement of the bill or hook 177. In the slot 176 of each of the twisting-plates and projecting radially thereof is a tongue 178, slightly bent or curved at its outer end and terminating at a point in alinement with the circumferential line of the plate. In the position shown in Fig. 7 the bill or hook 177 and the outer end of the tongue 178 are curved outwardly and downwardly and the adjacent lower wall of the slot is similarly curved to facilitate the entrance of the wire.

Figures 1, 8, 9:
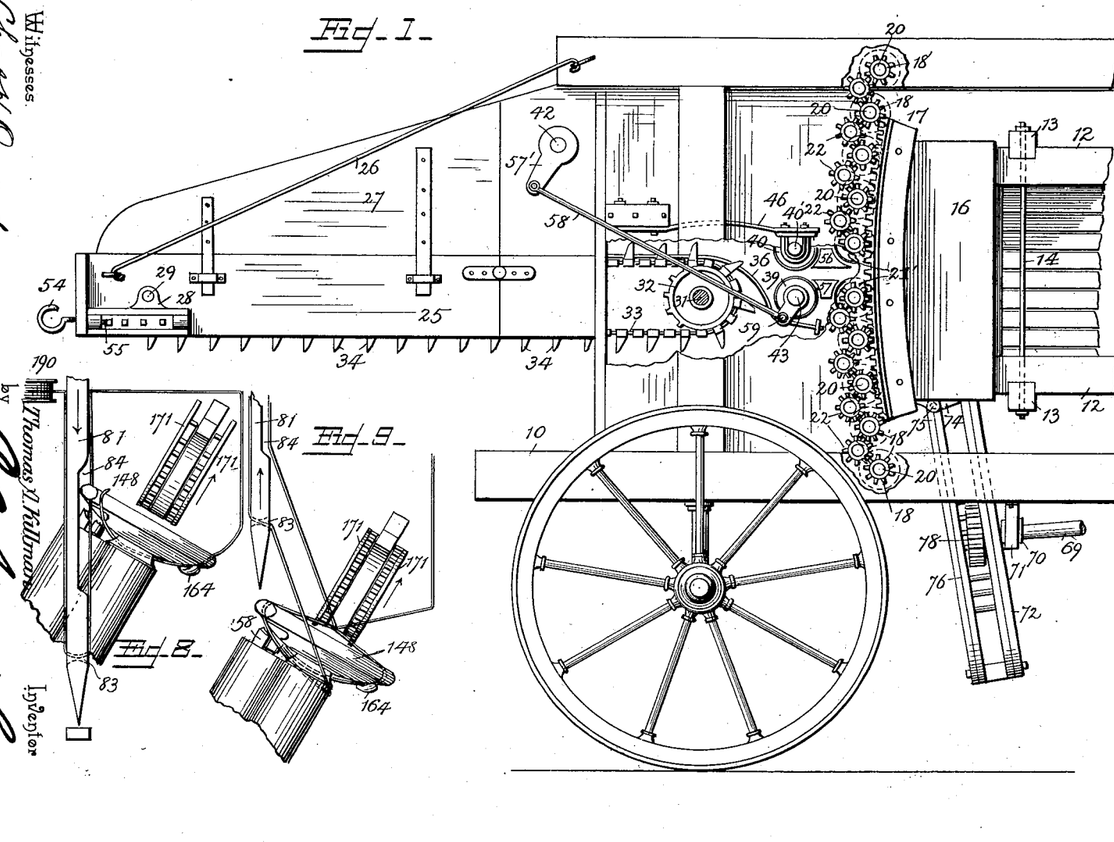
Figure 2:
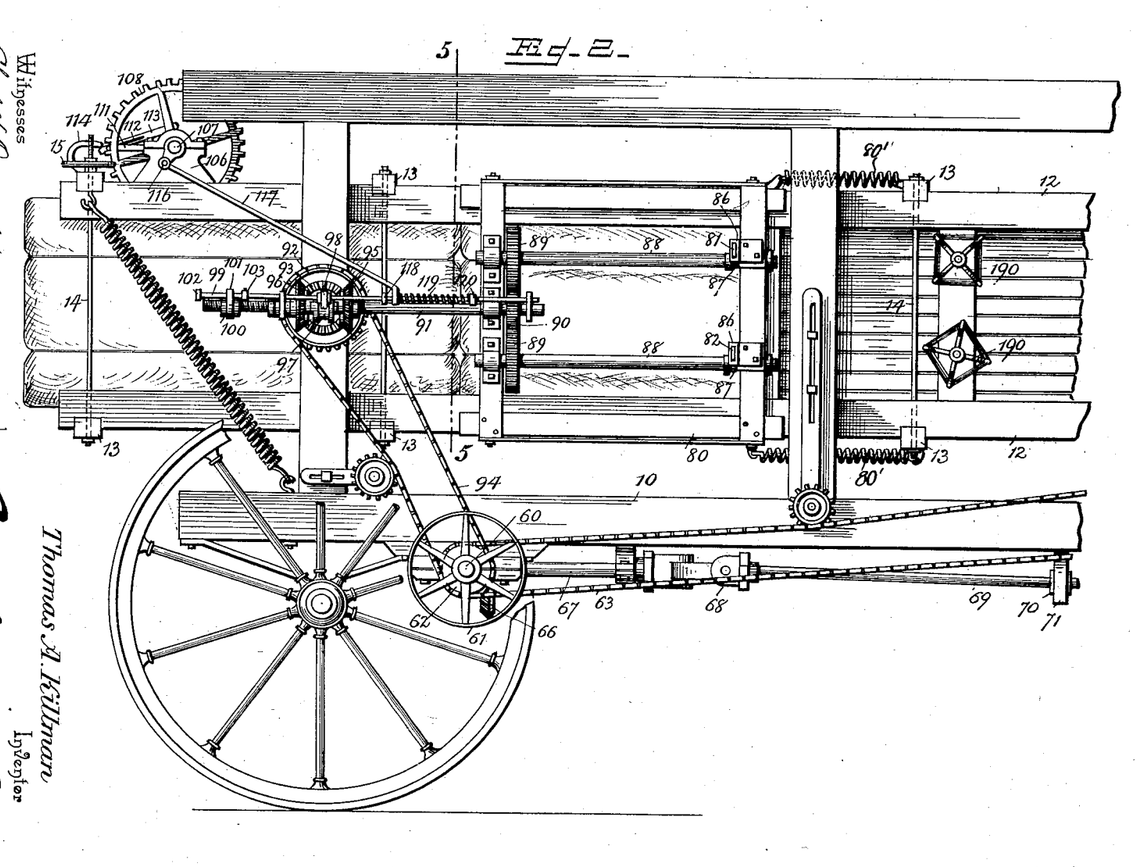
Figs. 2 and $2^a$ are similar views looking from the opposite side of the machine.
Figures 2, 11:
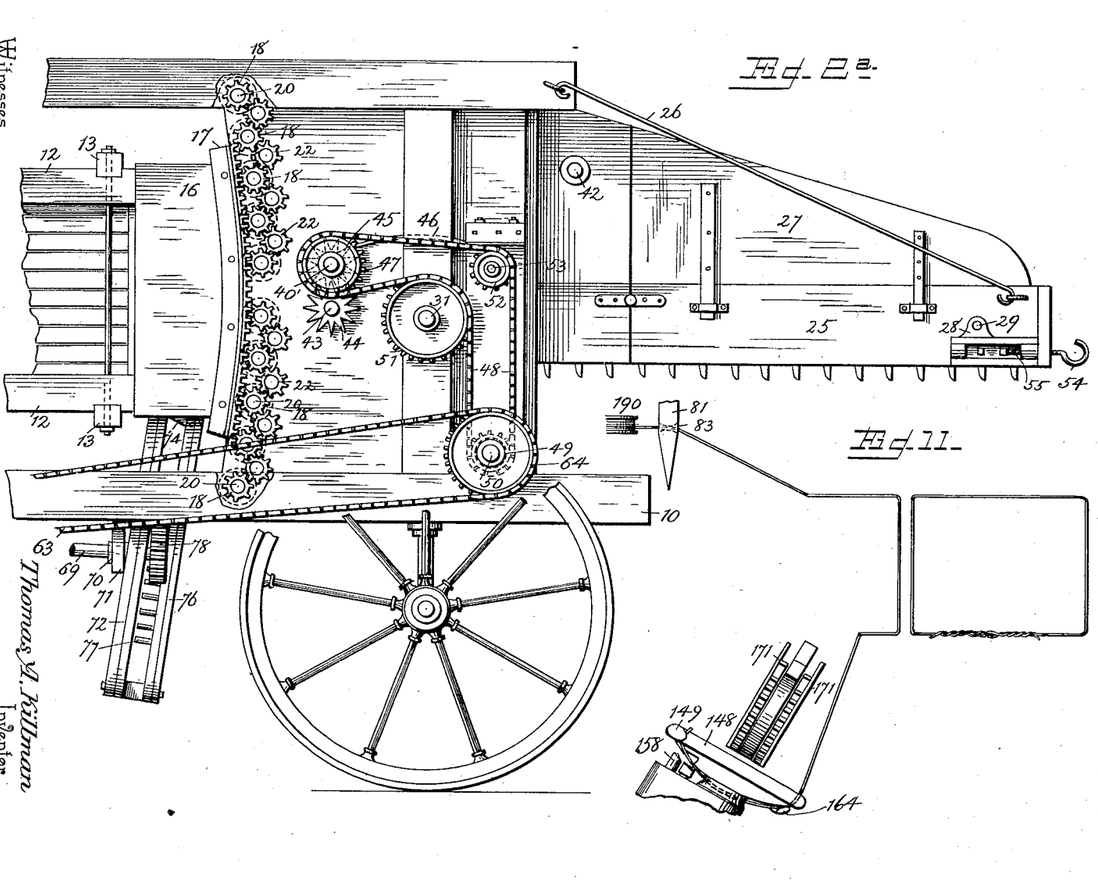
Figure 3:
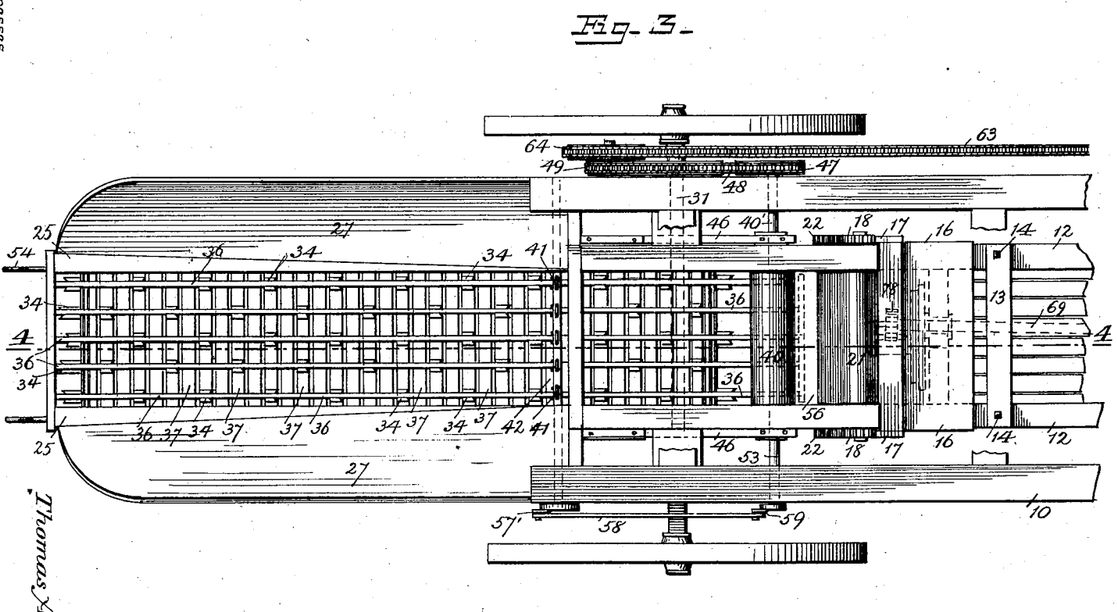
Figs. 3 and $3^a$ represent the machine in plan.
Figures 9, 10:
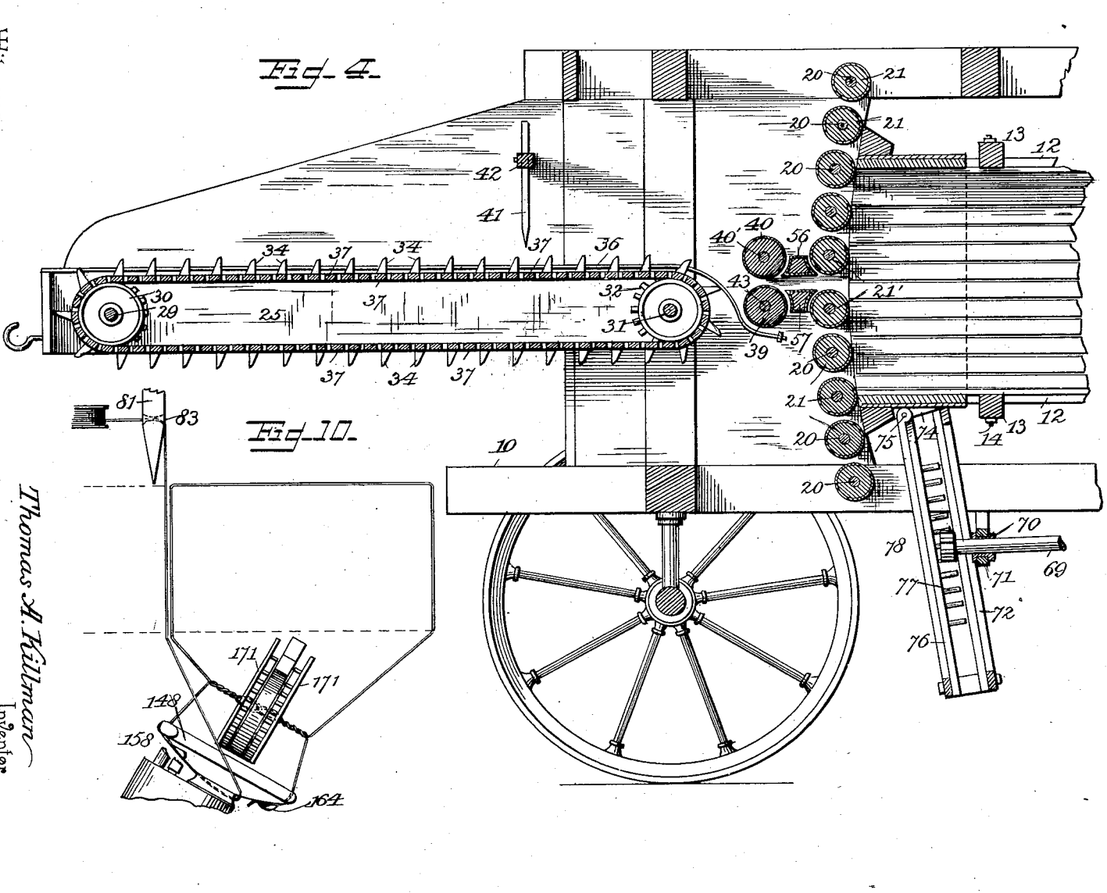
Figure 12:
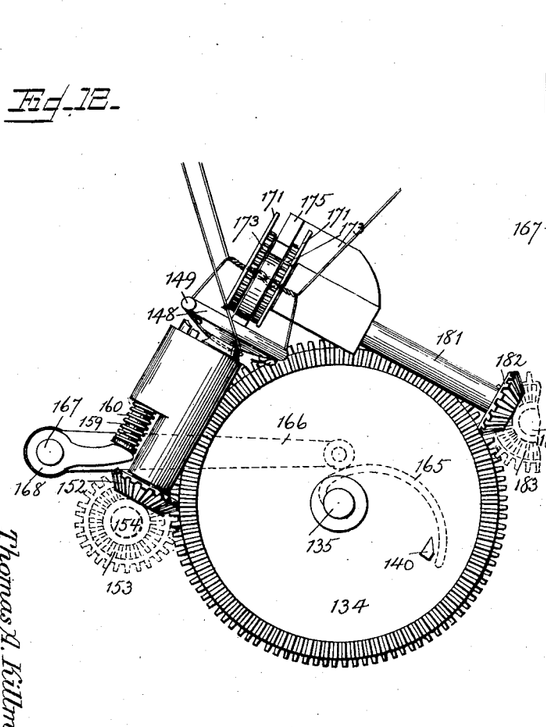
Fig. 12 is a detail plan view of the knot-tying and wire-cutting mechanisms, illustrating the mechanism for actuating the looping, twisting, and cutting devices.
Figures 13, 14:
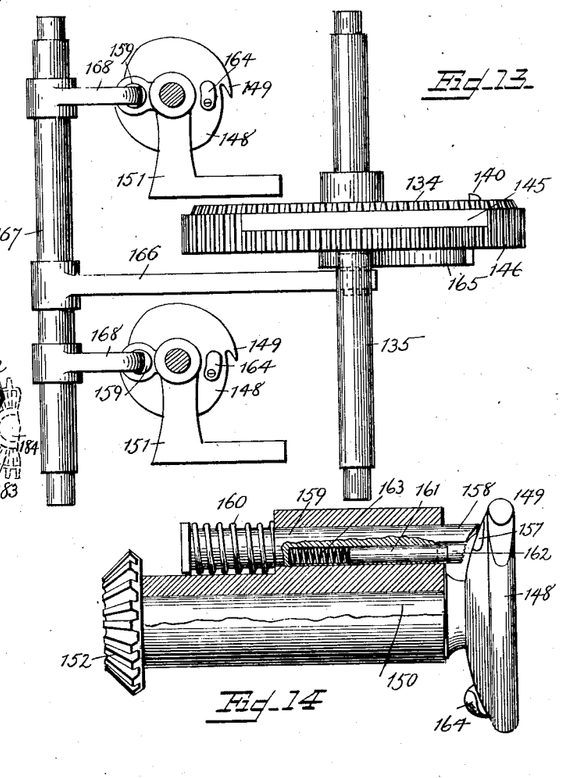
Fig. 13 is a side elevation of a portion of the mechanism illustrated in Fig. 12.
Fig. 14 is a detail sectional view of the wire clamping and cutting device drawn to an enlarged scale.
Figures 16, 17:
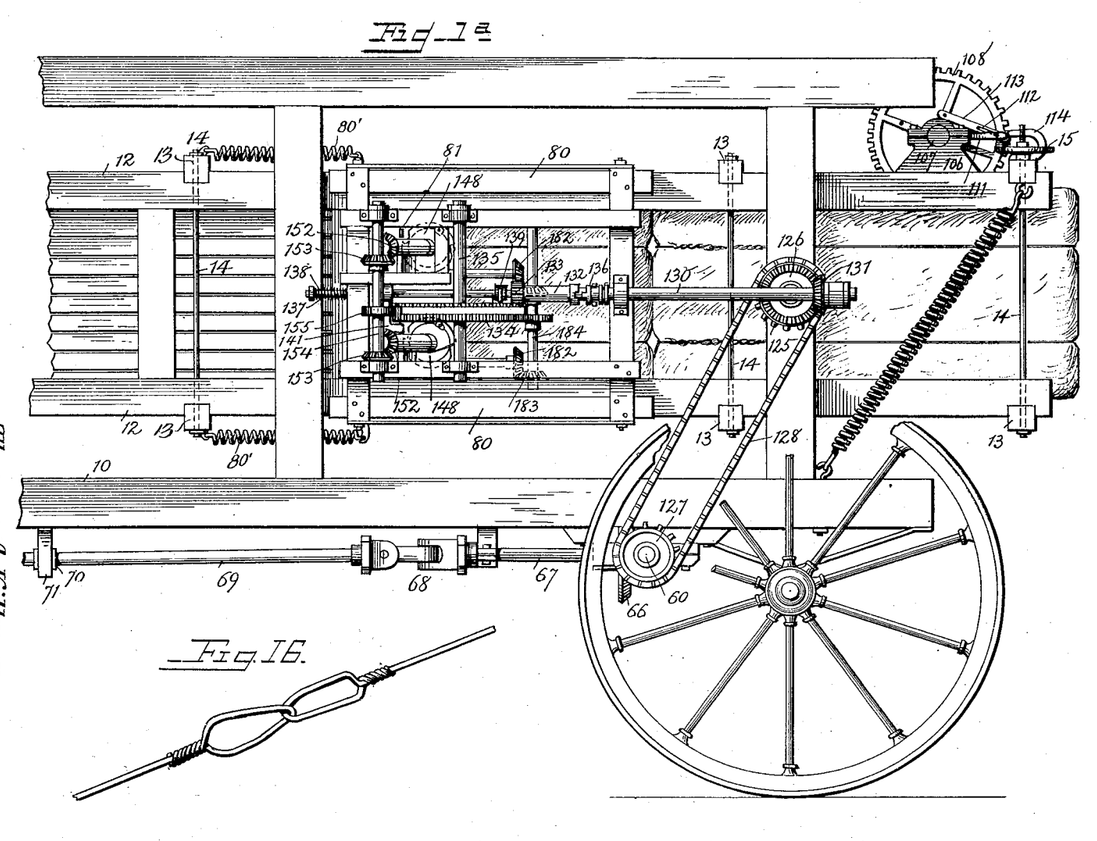
Fig. 16 is a perspective view of one of the twisted connections between the ends of a bale-wire.

The two gear-wheels 173 are provided with radial slots corresponding to the slot 176 of the twisting-plates to which they are secured, the width of the slot being approximately equal to the space between two adjacent teeth of the gear-wheels, so that said gears may revolve by intermeshing with gear-wheels 180, carried by shafts 181, adapted to suitable bearings and provided each with a bevel-gear 182, intermeshing with a bevel-gear 183 on a vertically-disposed shaft 184, the latter being also provided with a pinion 185, intermeshing with the teeth of the continuous spur-gear 146 on the shaft 135. The operation of this portion of the mechanism will be best understood by reference to Figs. 8, 9, and 10. In Fig. 8 the end of the wire leading around the rear or discharge end of the bale is shown as caught in the clamp 164 of the looper, said wire being illustrated in diagram as passing around the side of the bale at the opposite side of the baling-chamber and thence through the eye of the needle and back to the wire-reel 190, which is located on that side of the baling-chamber carrying the needle-operating mechanism. As shown in Fig. 8, the wire is stretched taut across the needle-recess 84, and the wire at this point is about to be engaged by one of the looper-hooks. In Fig. 9 is shown the next movement, the needle being on the reverse movement and the looper having accomplished one complete rotation to cross the wires engaged by the hook and removed from the needle and the wire engaged by the opposite hook and still held by the clamp 164. This completes the operation of the looper, and further movement is unnecessary until the needle is again forced through the compressed material to form another bale. The bill 177 of the twister engages the wire, the plates 171 engaging the two portions of the twisted wire on opposite points of the central line at which such wires cross, as indicated in Fig. 9, the wires being forced into the slots of the twisting-plates and engaged by the tongue 178 and there held during a number of revolutions of the twisting-plates until the wire assumes a position shown in Fig. 10, the operation being complete at this time with the exception of the severing of the wire and the removal of the twisted portion thereof from the tongues 178. During the movement of the twisters the cam 165 has been rotated and the tappet-arms 168 have been gradually forced into engagement with the plungers 160, each plunger being forced toward the loopers until the serrated or roughened head 162 of the smaller plunger engages and holds the wire at a point adjacent to the slot 157. The continued movement of the tappet-arms forces the cutter 158 into the slot 157 and severs the wire, the severed end being still held by the holder 161 and the latter being retained in contact with the wire, owing to the fact that the rotation of the gear-wheels and the cam 165 is stopped before the antifriction-roller carried by the rocker-arm 166 passes the end of the cam. The parts remain in this position until the further forward movement of the compressed material as fresh material is added to the baling-chamber pulls the twisted wire from the tongues, and the further movement brings the wire of which the end is held by the plunger 161 around and under the clamp 164, said wire being held in the clamp and drawn gradually from the reel as the compressed material travels through the baling-chamber and sufficient material has passed the needles to form a fresh bale. When this occurs, the parts are again operated, the gear-wheels and the cam 165 being first rotated to impart a movement to the cam 165 sufficient to bring the end of the cam past the end of the arm 166 and permit the release of the wire-holding plunger 161 and the cutter 158, after which the looper is free to revolve to again take the wire from the needle.

It will be understood that during the traverse of the needles across the baling-chamber and during the return movement to initial position the compressed material is still being moved to the rear. This necessitates some little movement of the frame 80 and all of the parts carried thereby. The frame is moved to the rear by the contact of the compressed material with the needles and is returned to initial position after each movement by means of springs 80', connecting the frame to a fixed cross-bar of the chamber.

The machine forming the subject of the invention may be mounted on a stationary base and operated in a manner similar to stationary baling-presses; but it is preferred to provide the same with running-gear in order that it may travel with a thresher, shredder, or similar machine to receive the material to be baled directly from said machine without the necessity of hauling the same to a central baler. It will also be understood that the several parts of the mechanism may be altered to accommodate different classes of material and that while the construction herein described, and illustrated in the accompanying drawings, is the preferred form of the device changes in the form, proportions, size, and minor details of the structure may be made without departing from the spirit or sacrificing any of the advantages of my invention.

Having thus described my invention, what I claim is—

1. A feed mechanism for a baling-press, comprising a pair of web-forming rollers, a plurality of feed-belts arranged in advance of the rollers and each provided with double prongs or fingers for engagement with the material to be baled, stripper-rods guided between said prongs or fingers and extended under one of the web-forming rollers at the discharge end of the belt.

2. A feeding device for baling-presses, comprising an endless belt on which the material to be baled is deposited, a plurality of oscillatory fingers or arms disposed above the belt and adapted to engage with and evenly distribute any excess of material on said belt, and means for imparting oscillatory or rocking movement to said fingers.

3. A feeding mechanism for a baling-press, comprising a pair of web-forming rollers, an endless belt, adapted to feed the material to be baled to said rollers, means for operating the rollers and the belt, a rock-shaft mounted above the belt and operatively connected to one of said rollers, and a plurality of adjustable fingers carried by the rock-shaft and adapted to engage with and distribute the material carried by the belt.

4. The combination with feeding mechanism and a baling box or chamber, of a pair of web-forming rollers, a spring-pressed bearing supporting one of said rollers to permit the separation of the rollers, and intermeshing gear-wheels connecting said rollers to each other, one of said gears having elongated teeth to permit the separation of the rollers without moving the gears out of contact, substantially as specified.

5. The combination with a supporting-frame, of a pivotally-mounted baling-box, means for oscillating the same, segmental racks carried by the baling-box, a plurality of compression-rollers carried by the frame and each provided with a rack-engaging pinion, and intervening idler-pinions intermeshing with the roller-pinions and forming a continuous train of gearing to thereby keep the rollers in constant motion.

6. The combination with a frame, of a pivotally-mounted baling-box, means for compressing a web of material within said box, a bar and a guard depending from the baling-box, a plurality of pins carried by the bar and forming a rack, a shaft, means for continuously revolving the shaft in one direction, a bearing-block for said shaft, a transversely-disposed guide for the bearing-box, and an antifriction-sleeve carried by the shaft and adapted for engagement with the guard to thereby maintain the pinion in constant mesh with the rack.

7. The combination with the frame, of a shaft mounted in fixed bearings thereon, a pivotally-mounted baling-box carried by the frame, means for compressing a web of material within said baling-box, a depending bar carried by the baling-box and provided with a plurality of pins to form a rack, a pinion adapted to intermesh with said rack, a continuous guard extending around the rack for maintaining the pinion constantly in mesh with the rack, a shaft carrying said pinion and having a flexible connection with the shaft carried by the frame, a bearing-block for the pinion-shaft, and a transversely-disposed guard in which said block is free to move to permit the pinion to engage alternately with the opposite sides of said rack.

8. The combination with a supporting-frame, of a pivotally-mounted baling-box, a bale-tying mechanism carried by the box, a power-transmitting shaft, and gearing connections between the shaft and the bale-tying mechanism, one of the intermediate gear-wheels of such gearing connections having its axis of rotation coincident with the fulcrum-point of the baling-box to thereby permit the transmission of power to the tying mechanism without regard to the position of the baling-box.

9. The combination with a baling-box, of a bale-tying mechanism, wire-feeding needles adapted to pass through the material and to start the operation of such mechanism, means for actuating the needles, and an automatic mechanism controlled by the movement of the compressed material within the box for starting and stopping the operation of the needle-actuating mechanism.

10. The combination with a baling-box, of a wire-twisting mechanism located at one side of the baling-chamber, wire-feeding needles disposed at the opposite side of the chamber and adapted to pass through the material and to start the operation of the wire-twisting mechanism, and means for automatically starting and stopping the movement of the needles.

11. In a device of the class specified, the combination with a baling-chamber, of a wire-twisting mechanism arranged at one side of the chamber, an operating means for said wire-twisting mechanism, means for automatically stopping the movement of the twisting means after the completion of each operation, needles adapted to pass through the material and to start the operation of the twister-operating means, an actuating device for the needles, and means for automatically starting and stopping the movement of the needle-actuating device.

12. The combination with a baling-chamber, of a frame mounted on the chamber, a twisting mechanism and a wire-feeding mechanism carried by the frame, pivot-pins forming a support for the baling-box, and a power-transmitting mechanism connected to the twisting and the wire-feeding means, one of the revoluble elements of the power-transmitting mechanism having its axis of rotation coincident with the pivotal axis of the baling-box.

13. The combination with a baling-box, of a wire-twisting mechanism, a plurality of needles, racks on the needles, pinions engaging said racks, a bevel-gear, means for rotating the same, a shaft having a gearing connection with the pinions, bevel-pinions mounted loosely on said shaft and engaging the bevel-wheel, and an automatically-operated clutch for connecting either of said pinions to the shaft.

14. The combination with a baling-box, of a wire-twisting mechanism, a plurality of needles, racks on said needles, pinions engaging the racks, shafts carrying said pinions, gears on said shafts, an auxiliary shaft, a pinion thereon intermeshing with both of the gears, a pair of loosely-mounted bevel-pinions carried by the auxiliary shaft, a driven bevel-gear intermeshing with both of the pinions, a clutch carried by the auxiliary shaft and movable into engagement with either of the pinions, and means for automatically operating said clutch to effect its engagement with one or other of the bevel-pinions.

15. The combination with a baling-box, of a wire-twisting mechanism, a plurality of needles, racks on the needles, pinions engaging the racks, shafts carrying said pinions, gears on said shafts, an auxiliary shaft, a pinion carried thereby engaging both of the gears, a pair of bevel-pinions loosely mounted on the auxiliary shaft, a driven bevel-wheel intermeshing with both pinions, a clutch carried by the shaft and adapted to engage with either of the bevel-pinions, a nut carried by a threaded portion of the auxiliary shaft and movable longitudinally of said shaft, a longitudinally-movable clutch-rod, a pair of collars mounted on the rod and engaging the nut when the latter nears the limit of its movement in each direction, means for connecting the clutch-rod to the clutch, a compression-spring carried by the clutch-rod, a revoluble shaft, a crank carried thereby, a rod connected to the crank and having a portion encircling the clutch-rod and bearing against the spring, and an auxiliary collar secured to the clutch-rod and adapted to be engaged by the rod extending from the crank, substantially as specified.

16. The combination with a baling-box, of a wire-twisting mechanism, a plurality of needles, an operating means therefor including a threaded shaft, a pair of bevel-pinions loosely mounted on the shaft, a driven bevel-gear intermeshing with both of the pinions, a clutch-rod, a clutch mounted on the shaft and connected to the rod, a nut mounted on the threaded portion of the shaft and having an arm embracing the rod, collars carried by the rod and adapted to be engaged by said arm, a compression-spring encircling the rod, and means for automatically compressing the spring and for retaining the same compressed during an operative movement of the shaft to thereby permit the shifting of the clutch, substantially as specified.

17. The combination with a baling-box, of a wire-twisting mechanism, a plurality of needles, actuating mechanism for the needles, a toothed wheel adapted to engage the compressed material within the box, a shaft on which said wheel is loosely mounted, mechanism connecting the shaft to the needle-actuating mechanism, a torsion-spring connecting the shaft and wheel, a projecting arm carried by the shaft and provided with a lug or pin, a slotted arm pivoted to the wheel and engaging said pin, and a fixed stop with which said slotted arm makes contact.

18. The combination with a baling-box, of a wire-twisting mechanism, a plurality of needles, actuating mechanism for the needles, a clutching mechanism for connecting the actuating mechanism to the needles, a toothed wheel adapted to engage the compressed material within the box, a shaft carrying said wheel and connected to the clutching mechanism, and means for connecting the shaft and wheel to permit a rapid revolving movement of the shaft after sufficient material has passed the needles to form a bale, substantially as specified.

19. The combination with a baling-box, of a wire-twisting mechanism, a plurality of needles, actuating mechanism for the needles, a clutching mechanism for connecting the actuating mechanism to the needles, a toothed wheel revoluble by engagement with the compressed material, a shaft on which said wheel is loosely mounted, a torsion-spring connecting the shaft to the wheel, mechanism connecting said shaft to the clutching mechanism, a slotted arm pivotally secured to the wheel, a radial arm rigidly secured to the shaft and having a pin engaging said slot, and a fixed stop for engagement with the slotted arm, substantially as specified.

20. The combination with baling mechanism, of a needle, a looper having a hook adapted to engage and withdraw the wire from the needle, and a twister comprising a pair of spaced plates slotted for the reception of the wire and each provided with a wire-engaging tongue and means for revolving the looper and the twister.

21. The combination with baling mechanism, of a needle, a revoluble looper having a wire-engaging clamp and provided with a pair of diametrically-opposed hooks, and a twisting device comprising a pair of spaced plates provided with radial slots for the reception of the wire, wire-engaging hooks forming a part of said plates, and tongues arranged within the slots and adapted to engage the wire.

22. The combination with baling mechanism, of a needle, a looping device for engaging the needle-wire and forming a loop therein, and a twister comprising a pair of slotted plates each provided with a wire-engaging tongue and adapted to engage with the looped wire carried by the looper, substantially as specified.

23. The combination with baling mechanism, of a needle, a looper in the form of a dished plate having peripherally-disposed wire-engaging hooks, a wire-clamp arranged on the rear face of the looper, a pair of connected twisting-plates each radially slotted and provided with a bill or hook adapted to enter the dished portion of the looper, wire-engaging tongues disposed in each of the radial slots, and means for operating the looper and the twisting-plates.

24. The combination with baling mechanism, of a needle, a looper having wire-engaging hooks and provided with a slot or recess, a clamp-plate carried by the looper, a cutter adapted to enter the slot or recess, a plunger carrying the cutter, an auxiliary wire-holding clamp carried by the plunger, and a twisting device adapted to engage with and remove the wire from the looper.

25. The combination with baling mechanism, of a needle, a looper having wire-engaging hooks and provided with a cutting slot or recess, a wire-clamp carried by the looper, a plunger mounted adjacent to the looper, a cutting-knife carried by the plunger and adapted to enter the slot or recess, an auxiliary spring-pressed plunger carried by the cutter-plunger and adapted to engage with and hold the wire against the face of the looper, means for actuating the plungers, and a twisting device adapted to engage with and twist the wire carried by the looper.

26. The combination with a supporting-frame, of a pivotally-mounted baling-box, a bale-tying mechanism carried by the box; means for actuating said bale-tying mechanism, a driven bevel-gear mounted on the pivotal axis of the baling-box, a power-transmitting shaft held in bearings on the baling-box; and a bevel-pinion carried by said shaft and intermeshing with said bevel-gear.

27. The combination with a supporting-frame, of a pivotally-mounted baling-box, a frame carried thereby, bale-tying mechanism supported by the frame at one side of the baling-box, means for operating said bale-tying mechanism, a needle disposed on the opposite sides of the baling-box and means operable by the needle for starting the operative movement of the bale-tying mechanism.

28. The combination with a baling-box, of a bale-tying mechanism mounted at one side of the box, mechanism including a constantly-revolving shaft for operating the bale-tying mechanism, a clutch carried by the shaft and movable to start the operation of the bale-tying mechanism, a longitudinally-movable clutch-rod to which said clutch is connected, a spring carried by the clutch-rod and normally tending to move the clutch to engaging position, a cam-actuated arm carried by the clutch-rod and adapted to move the clutch to releasing position at the end of each operative movement, an auxiliary releasing-arm carried by the clutch-rod, and a needle arranged at the opposite side of the baling-box and adapted to engage said auxiliary arm.

29. The combination with a baling-box, of a frame carried thereby, a pair of loopers, shafts mounted in bearings in the frame and carrying said loopers, bevel-wheels on said shafts, a vertically-disposed shaft carried by the frame and carrying bevel-gears intermeshing with those on the looper-shafts, twisting devices, operating-shafts therefor, bevel-gears carried by the shafts, a vertically-disposed shaft having bevel-gears intermeshing with those of the twisting mechanism, a horizontally-mounted gear-wheel having teeth for imparting intermittent mevement to the loopers and to the twisting devices, beveled or crown teeth arranged in the upper face of the gear, a driving-pinion intermeshing therewith, a shaft on which the driving-pinion is loosely mounted, and an automatically-operated clutching mechanism for engaging and releasing the driving cam and shaft.

30. The combination with a baling-box, of a supporting-frame carried thereby, wire-loopers and twisting mechanisms carried by said frame, a vertically-disposed shaft, a gear carried thereby and having gear-teeth for imparting intermittent rotative movement to the looper mechanism and to the twisting mechanism, bevel-teeth on said gear, a driving-pinion, a shaft on which the driving-pinion is loosely mounted, a clutch for engaging the pinion and shaft, a cam carried by the gear and adapted to move the clutch to disengaging position at the end of each complete rotation of the gear, and a needle disposed at the opposite side of the baling-box and adapted to cause the movement of the clutch to engaging position, substantially as specified.

31. A twisting device comprising a pair of spaced and radially-slotted plates, wire-engaging tongues disposed in the slots, slotted gears to which the plates are secured, a centrally-disposed slotted hub connecting the gears, a hub-support, and driving-gears intermeshing with the slotted gears of the twisting-plates.

32. A device of the class specified, a looper, a wire-engaging clamp carried thereby, and an auxiliary clamp for retaining the cut end of the wire during the rearward movement of the compressed material in the baling-chamber to permit the movement of the wire over the looper and into engagement with the looper-clamp.

In testimony that I claim the foregoing as my own I have hereto affixed my signature in the presence of two witnesses.

THOMAS A. KILLMAN.

Witnesses:
W. PERCY WHALEY,
JNO. O. WHALEY.